(12) United States Patent
Saito et al.

(10) Patent No.: US 6,579,083 B2
(45) Date of Patent: Jun. 17, 2003

(54) MOLD FOR PRODUCING FUEL CELL SEPARATOR

(75) Inventors: Kazuo Saito, Chiba (JP); Atsushi Hagiwara, Chiba (JP); Takashi Maki, Chiba (JP); Motohiko Kamogawa, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/760,164

(22) Filed: Jan. 12, 2001

(65) Prior Publication Data

US 2002/0004082 A1 Jan. 10, 2002

(30) Foreign Application Priority Data

Jan. 20, 2000 (JP) ............................. 2000-11095

(51) Int. Cl.⁷ ............................. B29C 33/00; B29C 43/38
(52) U.S. Cl. ................. 425/215; 425/412; 425/DIG. 47
(58) Field of Search ................. 425/215, 412, 425/DIG. 47

(56) References Cited

U.S. PATENT DOCUMENTS 2,633,603 A * 4/1953 Huse ........................ 425/215
2,731,669 A * 1/1956 Talalay ..................... 425/215
2,733,494 A * 2/1956 Bryer et al. ............... 425/215
3,287,486 A * 11/1966 Jurgeleit et al. ........... 425/412
3,957,411 A * 5/1976 Schiesser .................. 425/215
5,023,041 A * 6/1991 Jones et al. ............... 264/258
5,433,915 A * 7/1995 Yamamoto et al. ......... 264/258

FOREIGN PATENT DOCUMENTS

DE   19910487 C1  *  6/2000
JP       08180892 A  *  7/1996
JP       10040937 A  *  2/1998
WO   WO-00/30202 A1 *  5/2000

* cited by examiner

*Primary Examiner*—Robert Davis
(74) *Attorney, Agent, or Firm*—Muramatsu & Associates

(57) ABSTRACT

A mold for producing a fuel cell separator with which a flash, even if it occurs, does not cause a thickness unevenness. The mold includes a plurality of molds 2, 4 and 10, and a fuel cell molding cavity 5 for separator being defined among the molds. At least one of the molds is provided with a flash reservoir cavity 11 which is communicated with the cavity 5. An amount of material in excess of the volume of the cavity 5 is charged, and melted by the application of pressure and heat. The melted material fills up the entire cavity 5, with the excess thereof entering the cavity 11. Since the molds 2 and 10 maintain a direct contact with each other, it is possible to obtain a separator molded with a high accuracy.

3 Claims, 4 Drawing Sheets

MOLD FOR PRODUCING FUEL CELL SEPARATOR

BACKGROUND OF THE INVENTION

The present invention relates to a production of a fuel cell separator, and more particularly to a mold capable of achieving a high dimensional accuracy in the molding process. Fuel cells of the type where a fuel gas and an oxidant gas are used, particularly, solid polymer type fuel cells have a structure in which an ion coductive solid electrolyte membrane is sandwiched between an anode and a cathode which are gas diffusion electrodes carrying a catalyst thereon, the sandwich being further sandwiched between separators. The separator on the anode side supplies hydrogen gas as the fuel gas to the anode, and the separtor on the cathode side supplies oxygen gas as the oxidant gas to the cathode.

FIG. 4 is a diagram illustrating such a fuel cell separator. As shown in the figure, a separator 1 has a planar surface with a narrow channel 1a provided thereon. In order to increase the contact area between the gas diffusion electrode and the gas, the channel 1a is meandering with a small pitch on the whole surface of the separator substantially across the entire surface of the separator. The channel 1a may be provided either on both sides of the separator, as illustrated in FIG. 4b, or on only one side thereof.

Such a separator 1 requires a high accuracy in it's thickness. This is because the separator contacts with the anode or cathode and electricity is conducted therebetween, so that if the surface accuracy is poor, the contact area therebetween decreases, thereby lowering the conductivity. Moreover, if the surface accuracy is rough, a gap may occur between the separator and the anode or cathode so that a force is imparted in such a direction as to squash the gap, thereby cracking the separator. In other words, as the surface accuracy increases, the contact resistance decreases and the separator is less likely to crack, thus improving the performance of the fuel cell.

A conventional way of producing a fuel cell separator is as follows. First, as the starting material, a material compound is produced by, for example, mixing 25 parts by weight of a phenol resin to 100 parts by weight of a flake graphite (average particle diameter: 30 $\mu$m), and the material compound is processed into a powder form. It is sometimes processed into a granular form or a pellet form, as well as a powder form.

As shown in FIG. 5a, the mold consists of a lower mold 2, a middle mold 3 and an upper mold 4. A cavity 5 for forming the fuel cell separator 1 therein is defined among the three molds. Specifically, the channel la for the reverse surface of the fuel cell separator 1 is provided on the lower mold 4; the middle mold 3 has an aperture which corresponds to the outer shape of the fuel cell separator 1; the channel la for the front surface of the fuel cell separator 1 is provided on the upper mold 2; and the distance between the upper and lower molds corresponds to the thickness of the separator.

The lower mold 4 and the middle mold 3 are attached to the fixed bed side of a press machine, and the upper mold is attached to the upper side of the press machine which can be raised and lowered.

The upper mold 2 is retracted by being raised up, and then the above-described powder form material is charged into the middle mold 3. The charging amount is adjusted to a weight which is slightly in excess of the weight of the produced fuel cell separator. This is to ensure that the material is sufficiently charged into every corner of the cavity 5. After the material is charged, the upper mold 2 is lowered to compress the powder form material, and the mold is heated by a heater (not shown) to about 432 K. The separator material is melted by the heat application, and is advanced into every corner of the cavity 5 by the applied pressure (about 2 KPa). Some gas vent holes (not shown) for communicating the cavity 5 to the outside is provided at appropriate locations of the mold to externally discharge the air which is originally contained in the cavity 5 and a gas which is generated from the material, thereby ensuring that no void is produced in the fuel cell separator. A vacuum pump may be used for the gas ventilation.

However, a mold as described above has the following problem. Since an amount of material that is slightly in excess of the amount sufficient to fill up the cavity is charged into the mold, there is some material which cannot be accommodated within the cavity 5 when the material is melted by the pressure and heat application. This excess of material moves up along the gap between the middle mold 3 and the lower mold 4 and then into the gap between the upper surface of the middle mold and the lower surface of the upper mold, where it is cooled and cured. This run-out portion is commonly called "flash" 6.

It is not problematic if the flash 6 is formed with a uniform thickness between the middle mold 3 and the upper mold 2. Typically, however, the flash 6 has an uneven distribution, e.g., it occurs in a single location as illustrated in the figure. As a result, the upper mold 2 is slanted as illustrated in FIG. 5b, thereby causing a 0.2 mm or greater difference or unevenness in the thickness of the produced fuel cell separator 1.

The present invention has been made in view of the above-described circumstances, and has an object of providing a mold for a fuel cell separator with which a flash, even if it occurs, does not cause a thickness unevenness.

SUMMARY OF THE INVENTION

In order to achieve the above-described object, the present invention provides a mold for producing a fuel cell separator, comprising a plurality of molds, a fuel cell molding cavity for separator being defined among the molds, wherein at least one of the molds is provided with a flash reservoir cavity which is communicated with the cavity.

The flash reservoir cavity may be provided by digging on a surface of one mold along which the mold contacts with another mold, so that the flash reservoir cavity extends to surround the fuel cell molding cavity for separator; the surface on which the flash cavity is provided by digging may closely contact the other mold, thereby defining the fuel cell molding cavity for separator; a sealing member may be provided external to the flash reservoir cavity for providing sealing; and the mold may be for use with a press machine.

BRIEF DESCRIPTION OF THE DRAWINGS

The above and other objects, aspects, features and advantages of the present invention will become more apparent from the following detailed description when read in conjunction with the accompanying drawings, in which:

FIG. 1a and FIG. 1b illustrate a mold for producing a fuel cell separator according to the present invention, wherein FIG. 1a is a cross-sectional view, and FIG. 1b is a top view illustrating a middle mold.

FIGS. 4a, 4b illustrates a fuel cell separator, wherein FIG. 4a is a top view, and FIG. 4b is a cross-sectional view along line B—B in FIG. 4a.

DESCRIPTION OF THE PREFERRED EMBODIMENT

Figure 1A:
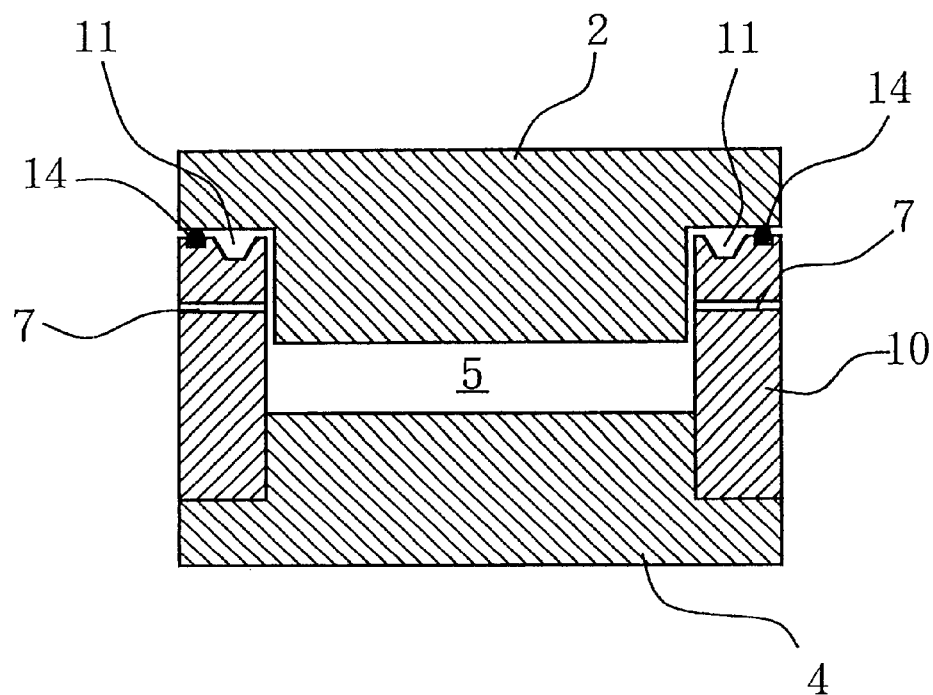
Figure 1B:
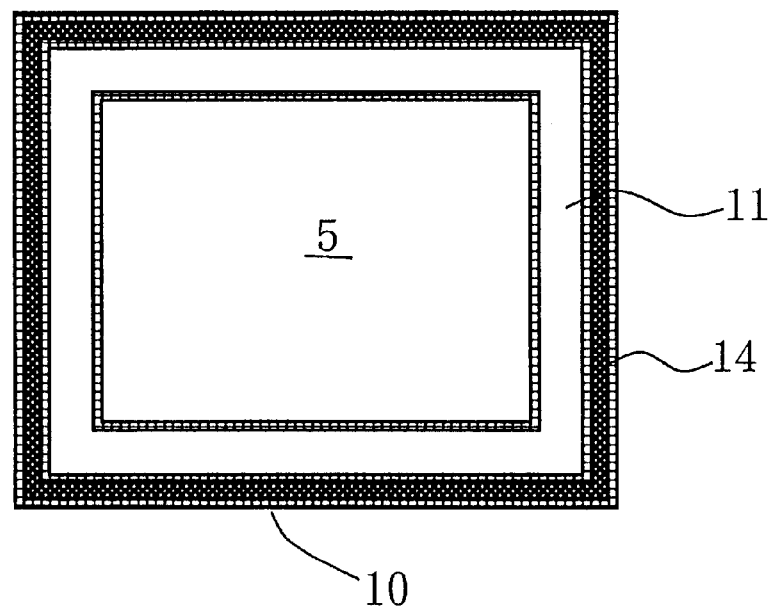
Figure 2:
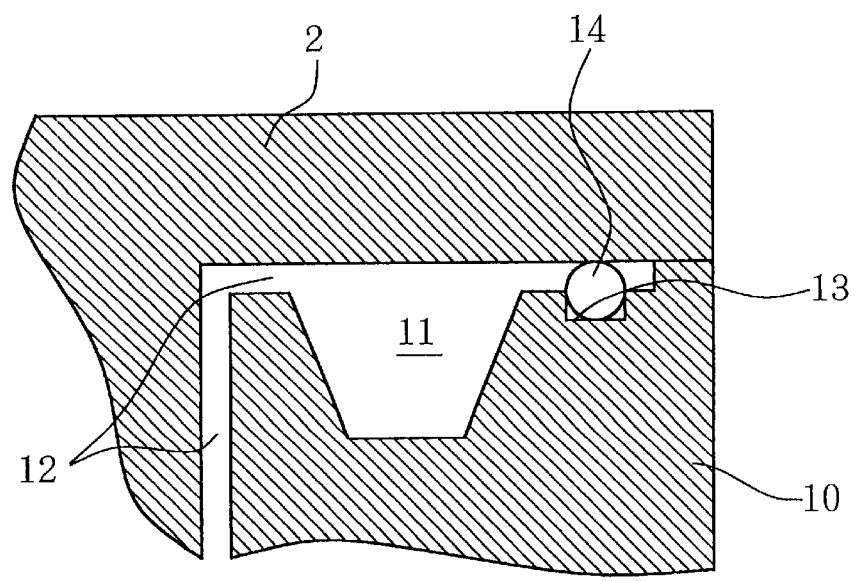
FIG. 2 shows an enlarged view illustrating a portion where the middle mold and the upper mold shown in FIG. 1 contact with each other.

An example of a mold for producing a fuel cell separator according to the present invention will now be described with reference to the drawings. FIG. 1 is a diagram illustrating a mold for producing a fuel cell separator according to the present invention, wherein FIG. 1a is a cross-sectional view, and FIG. 1b is a top view illustrating a middle mold. FIG. 2 is an enlarged view illustrating a portion where the middle mold and the upper mold shown in FIG. 1 contact with each other. Reference numeral 7 denotes gas vent hole to discharge the air in the cavity to outside. Those members that are common with the conventional example will be provided with the same reference numerals, and the members that are different from the conventional example will be focused on in the following description.

The mold of the present invention has a flash reservoir cavity 11 provided on a surface of a middle mold 10 along which the middle mold contacts with the upper mold 2, and has a passage 12 defined between the middle mold 10 and the upper mold 2 for communicating the cavity 5, which is defined among the plurality of molds, and the cavity 11 with each other. While the passage 12 may be provided only in one location, it may be provided in a plurality of locations, in which case the melted material moves smoothly. Alternatively, a gap between molds can be utilized as the communication passage 12.

Similarly, while the flash reservoir cavity 11 may be provided only on one side of the cavity 5, it may be provided around the entire periphery of the cavity 5 as in the illustrated example, in which case it is possible to effectively increase the volume of the flash reservoir cavity 11 without increasing the size of the mold.

According to the present invention, a sealing groove 13 is further provided external to the flash reservoir cavity 11 into which a sealing member 14 such as a rubber-made O-ring, or the like, is inserted so as to prevent the melted material from running out to the outside. Moreover, as illustrated in FIG. 2, the middle mold 10 and the upper mold 2 directly and closely contact with each other external to the sealing member 14.

Figure 3:
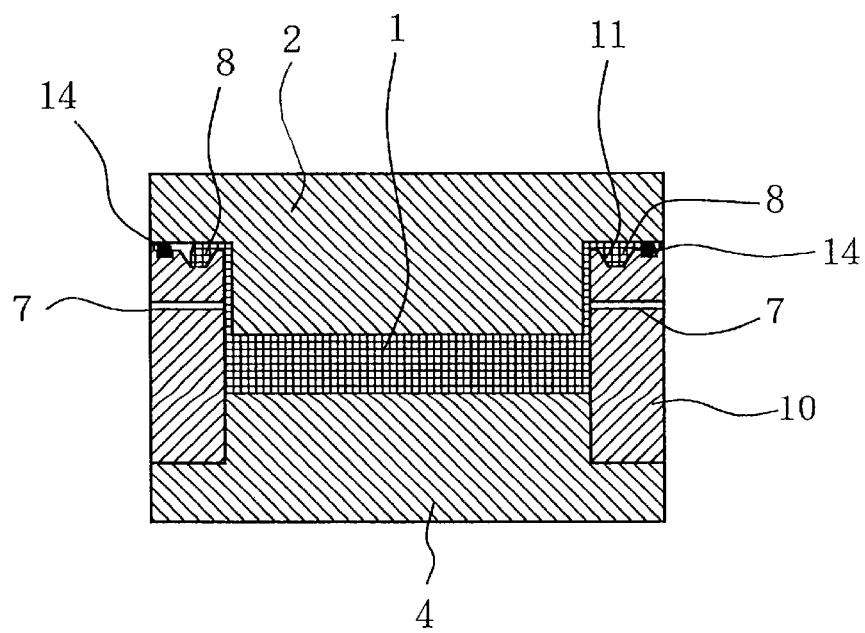
FIG. 3 illustrates a fuel cell separator being molded in the mold of FIG. 1a and FIG. 1b.
Figure 4A:
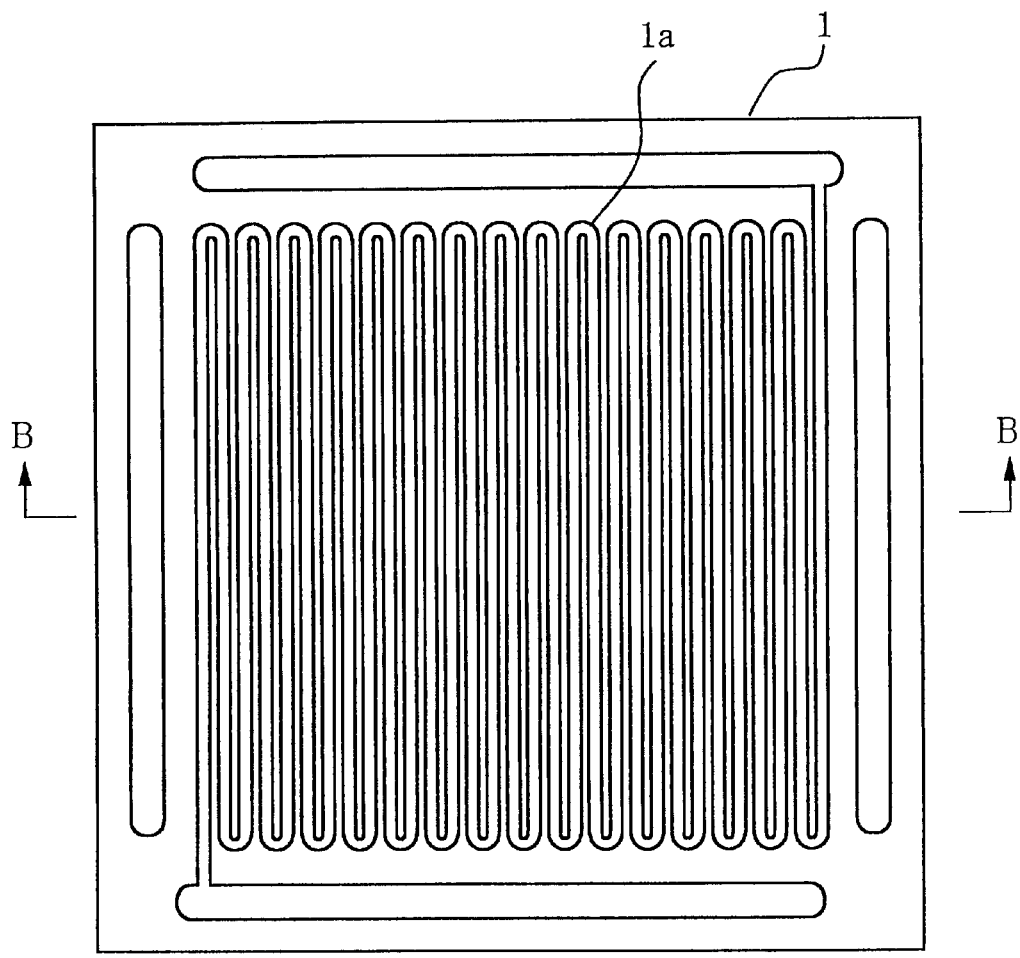
Figure 4B:
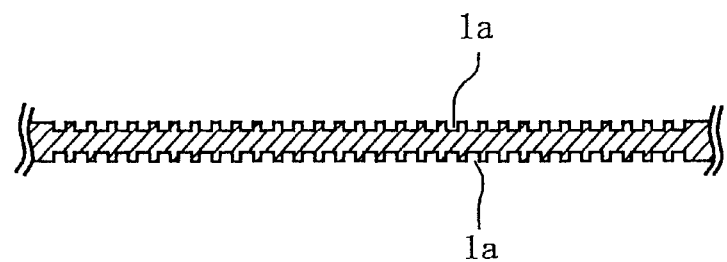
Figure 5A:
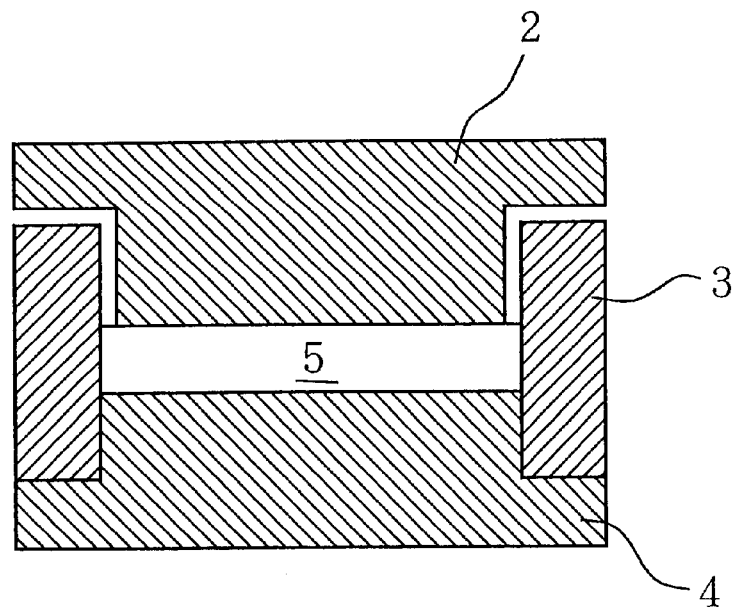
FIG. 5a is a diagram illustrating a conventional mold for producing a fuel cell separator.
Figure 5B:
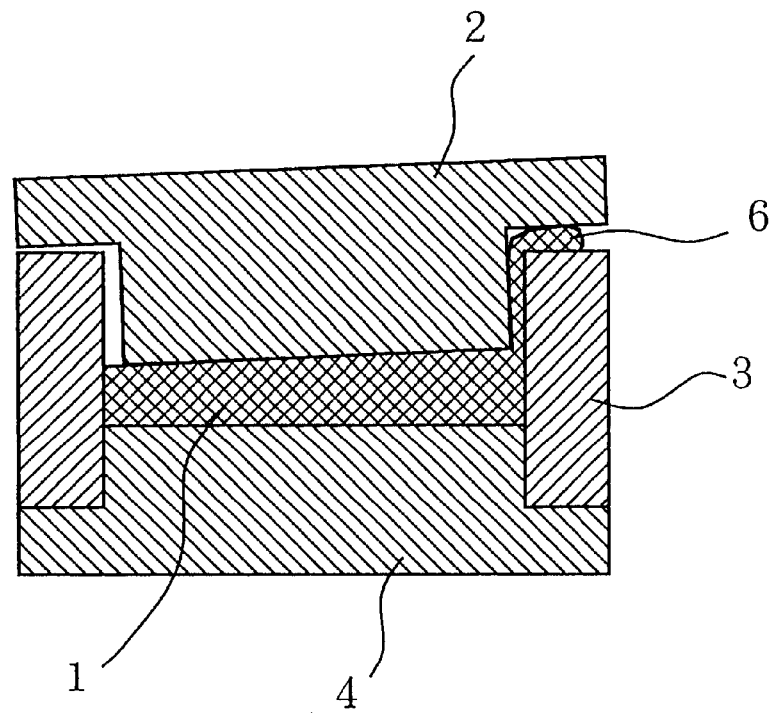
FIG. 5b is a diagram illustrating a fuel cell separator being molded.

FIG. 3 illustrates a fuel cell separator having been formed in the mold of FIG. 1. As already explained in the description of the conventional example, a powder form material, as that of the conventional example, is charged after the upper mold 2 has been raised. The charging amount is adjusted to an amount which is in excess of the volume of the fuel cell separator but no greater than the sum of the volume of the fuel cell separator and the volume of the flash reservoir cavity 11. Then, the upper mold 2 is lowered, and the material is melted by compression and heating under conditions similar to those of the conventional example, so that the material is charged into every corner of the cavity 5. A portion of the charged material in excess of the volume of the fuel cell separator 1 passes through the passage 12 into the flash reservoir cavity 11, where it is cured into a flash 8.

Although the excess of material is not so much as to fill up the entire flash reservoir cavity 11, there may be a case where the material flow is localized to one location along the flash reservoir cavity 11. In such a case, the material in that location may overflow to the outside of the cavity 11 and become cured between the upper mold 2 and the middle mold 10, thereby pushing up the upper mold 2.

In the example of the present invention, in order to address this problem, the sealing groove 13 is provided by digging external to the flash reservoir cavity 11 with the sealing member 14 being placed therein so as to prevent the material from running out to the outside. In this way, it is possible to ensure the close contact of the upper mold 2 with the middle mold 10, and to maintain the thickness dimension of the fuel cell separator 1 with a good accuracy.

The mold of the present invention is designed so that the surface of a mold on which the flash reservoir cavity is provided and the surface of another mold facing the mold directly and closely contact with each other. As a result, when a fuel cell separator with each side being, for example, about 200–300 mm long was produced, it was possible to keep the difference between the maximum value and the minimum value of the separator thickness to be 0.08 mm or less.

In the example described above, the mold is divided into three pieces, i.e., the upper mold, the middle mold and the lower mold. Alternatively, it may be divided into two pieces, i.e., an upper mold and a lower mold, or more than three molds may be used. Furthermore, while the example described above is of the type for use with a press machine, the structure of the present invention is also applicable to a mold for use with injection molding.

As described above, the present invention provides a mold for producing a fuel cell separator, comprising a plurality of molds and a fuel cell molding cavity for separator being defined among the molds, wherein at least one of the molds is provided with a flash reservoir cavity which is communicated with the cavity. Thus, any excess of material which cannot be accommodated within the cavity for the separator can be absorbed into the flash reservoir cavity, so that no flash is formed in a gap between molds, whereby a fuel cell separator can be molded with a good dimensional accuracy.

When the flash reservoir cavity is provided by digging on a surface of one mold along which the mold contacts with another mold, so that the flash reservoir cavity extends to surround the fuel cell molding cavity for separator, it is possible to provide a flash reservoir cavity which is large in volume without increasing the size of the mold.

When a sealing member is provided external to the flash reservoir cavity for providing sealing, even if the excess of melted material is localized to one location along the flash reservoir cavity, it is possible to prevent the material from running out to the outside beyond the sealing member. Thus, it is possible to prevent a flash from being formed between molds and thereby reducing the dimensional accuracy of the separator.

What is claimed is:

1. A mold for producing a fuel cell separator, comprising:
    a plurality of molds;
    a fuel cell molding cavity which is defined by said plurality of molds for molding a separator; and
    a flash reservoir cavity provided at least one of said molds and communicates with said fuel cell molding cavity;
    wherein the flash reservoir cavity is provided on a surface of one mold along which the mold contacts with another mold so that the flash reservoir cavity extends to surround said fuel cell molding cavity;
    wherein a sealing member is provided external to the flash reservoir cavity for sealing.

2. A mold for producing a fuel cell separator according to claim 1, wherein the surface on which the flash cavity is provided contacts the other mold, thereby defining the fuel cell molding cavity for separator.

3. A mold for producing a fuel cell separator according to claim 1, wherein the mold is for use with a press machine.

* * * * *